United States Patent [19]

Saner

[11] 3,946,821

[45] Mar. 30, 1976

[54] BALANCE

[75] Inventor: Kaspar Saner, Dubendorf, Switzerland

[73] Assignee: Wirth Gallo & Company, Zurich, Switzerland

[22] Filed: Jan. 27, 1975

[21] Appl. No.: 544,570

[30] Foreign Application Priority Data

Aug. 14, 1974 Switzerland.................. 11140/74

[52] U.S. Cl. ................................................ 177/227
[51] Int. Cl.[2] .......................................... G01G 3/18
[58] Field of Search ............ 177/164, 226, 227, 235

[56] References Cited
UNITED STATES PATENTS

| | | | |
|---|---|---|---|
| 1,890,569 | 12/1932 | Burkheisen | 177/226 |
| 3,773,125 | 11/1973 | Saner | 177/227 |

FOREIGN PATENTS OR APPLICATIONS

| | | | |
|---|---|---|---|
| 147,715 | 5/1951 | Australia | 177/226 |

*Primary Examiner*—George H. Miller, Jr.
*Attorney, Agent, or Firm*—Stevens, Davis, Miller & Mosher

[57] ABSTRACT

Balances having a reference mass and means for compensating for thermally induced errors such as shift of the zero-point and change of steepness in the characteristic of the balance. Bimetallic members are fastened to movable parts such as levers or other force transmitting members, or to the reference mass, and function as supports for masses acting as compensating masses. This allows for offsetting the two kinds of errors independently. Moreover, the bimetallic supports can be mounted on adjustable members, e.g. rotary disks or the like, to further adjust the desired amount of correction.

8 Claims, 6 Drawing Figures

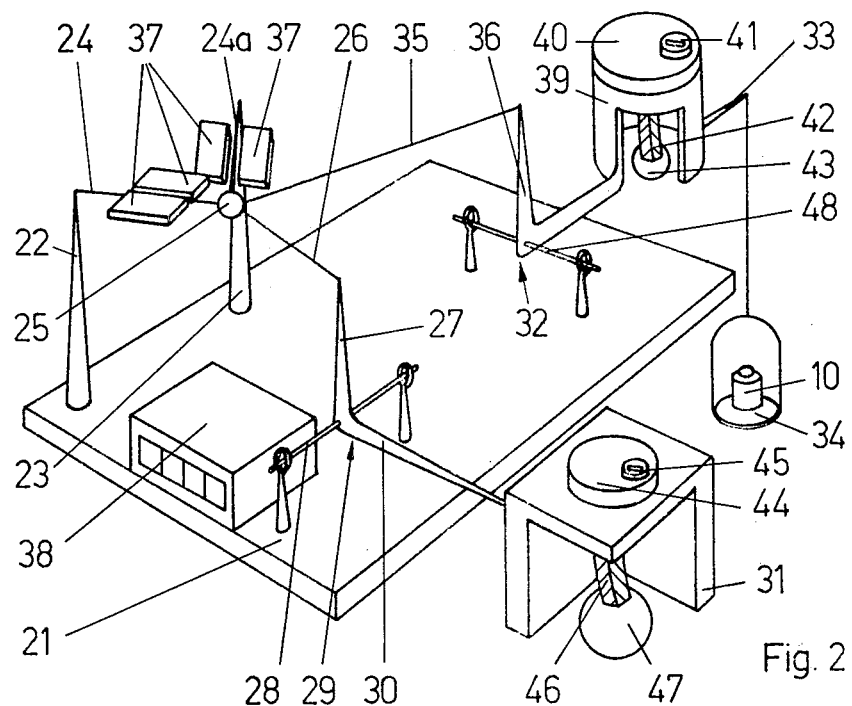
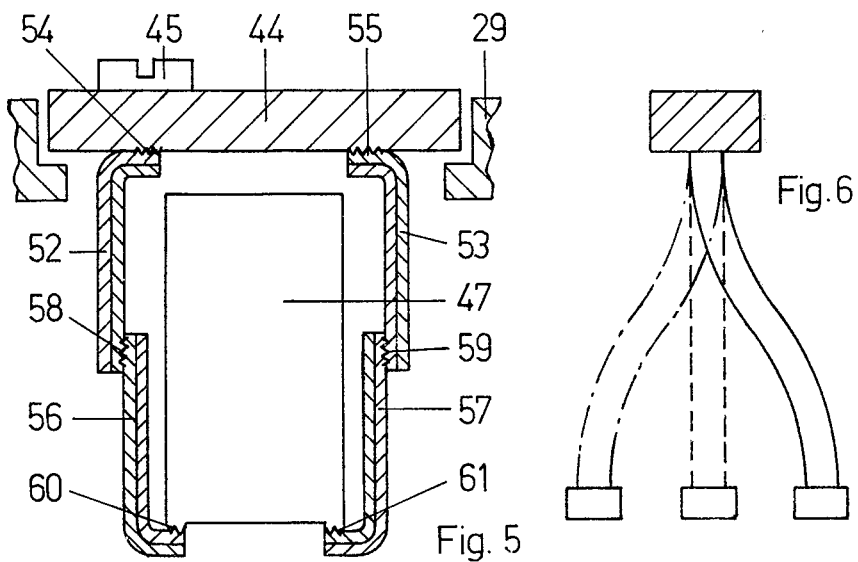

BALANCE

This invention relates to balances having a reference mass and more particularly it relates to such balances having means for compensating for thermally induced errors such as shift of the zero-point and change of steepness of the characteristic of the balance.

It is known from the prior art to offset said thermally induced errors by means of bimetallic members mounted to the framework of the balance and acting upon a member transmitting the force derived from the weight of the mass to be measured and/or upon the reference mass by means of elastic members such as springs. Such compensating apparatus is difficult to realize in balances with big lift and leads to weighing errors in balances working under severe vibration conditions. Due to the fact that the bimetallic members in such compensating apparatus are mounted to the framework of the balance, extensive experimentation is necessary in order to select and to install the bimetallic members taking care of the temperature induced errors of a specific balance.

A compensating apparatus of the kind described above is known from the Swiss Pat. No. 541 132. In addition to the aforesaid this apparatus has means facilitating the adjustment of the compensating means of every single balance.

According to the present invention the bimetallic members are not mounted to the framework and do not act upon the weight transmitting means and/or the reference mass by means of springs. Instead the bimetallic members are fastened to moveable parts such as levers or other force transmitting members, or to the reference mass, and function as supports for masses acting as compensating masses. This allows for offsetting the two kinds of errors independently. Moreover the said bimetallic supports can be mounted onto adjustable members, e.g., rotary disks or the like, therefore also the desired amount of correction can be taken care of.

Embodiments of the invention are represented schematically in the enclosed drawings.

FIG. 2 is a diagrammatic illustration of a balance with vibrating strings incorporating two compensating masses on bimetallic supports carried by adjusting members;

FIG. 5 is a sectional view of a compensating mass carried by a frame combined from bimetallic strips of different bending direction;

FIG. 6 is a schematic illustration of the behaviour of the frame shown in FIG. 5 under different temperature conditions.

Figure 1:
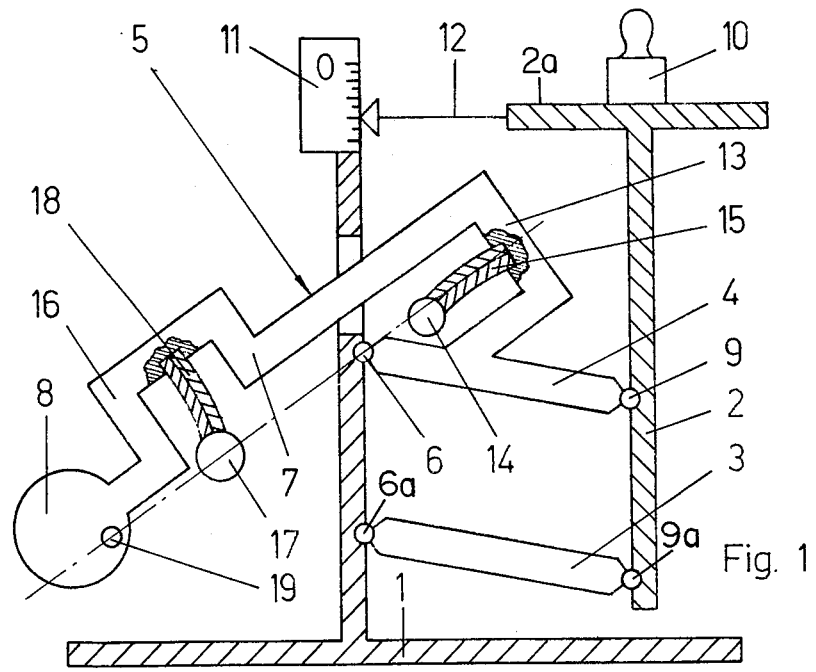
FIG. 1 is an elevational view, partly in section, of an inclination scale incorporating two compensating masses carried by bimetallic supports, according to this invention.

FIG. 1 of this drawing shows an inclination scale. Pivoting on two hinges 6, 6a mounted to a base 1 there are two parallel radius rods 3, 4 linked to a loading bar brace 2 by means of two hinges 9, 9a. Due to the said arrangement the loading bar brace 2 is guided in parallel to itself, when a mass 10 is put on a pan 2a mounted rigidly to the loading bar brace 2. The base 1 carries a scale 11 on which the weight of the mass 10 is indicated by a needle 12 fastened to the pan 2a. Extending from and fastened to the radius rod 4 is a lever 5 having a reference mass 8 fastened to its end. In a first bow 13 of the lever 5 a first compensating mass 14 is fixed by means of a bimetallic support 15. In a second bow 16 of the lever 5 a second compensating mass 17 is fixed by means of a bimetallic support 18. Reference numeral 19 indicates the location of the center of gravity of the lever 5 and all parts mounted thereto by means of the bimetallic supports. At reference temperature the center of gravity 19, the centers of gravity of the compensating masses 14, 17 and the hinge 6 all are contained in the same plane perpendicular to the plane of the paper and indicated by a dashed line 7. Moreover at reference temperature the bimetallic supports 15, 18 are flat, the direction of the support 15 coinciding with the abovementioned plane, the direction of the support 18 being perpendicular thereto. At elevated temperature the lever 5 becomes longer, shifting the zero point. This error is compensated by the reference mass 14 the bimetallic support 15 of which bends towards the loading bar brace 2. Likewise the bimetallic support 18 of the compensating mass 17 bends towards the hinge 6, thereby offsetting the shift of the center of gravity 19 the location of which determines the steepness of the characteristic of the balance. From the aforesaid it is obvious, that the two corrections work independently from each other and are dependent only on the temperature changes with respect to the reference temperature. It is furthermore obvious to those skilled in the art, that the compensating masses 14, 17 can either both or only one of them be fixed to another moving part of the balance, as long as the desired effect is maintained, e.g. the mass 14 is fixed to a protrusion of the radius rod 3, and mass 17 to a lever moving in parallel to lever 5. If only one of the abovementioned errors shall be compensated for, obviously only the corresponding mass on its bimetallic support is necessary for taking care of the desired correction.

In Fig. 2 a balance with vibrating strings is diagrammatically illustrated. Mounted to a base 21 there are two supports 22, 23 to each of which is fixed one end of two vibrating strings 24, 24a, respectively, whose oscillations are maintained and monitored by four exciting- and sensing-heads 37, which are electrically connected (not shown) to a computing and display unit 38.

The other ends of said strings 24, 24a are held by a central member 25, to which two wires 26, 35 are equally fastened. The wire 26 is fixed to the upright arm 27 of an L-shaped lever 29, the level arm 30 of which is loaded by the weight of a reference mass 31, thereby the strings 24, 24a are pretensioned. The lever 29 pivots on an axle 28 fixed to the base 21. The reference mass 31 carries a rotary disk 44 to which a compensating mass 47 is mounted by way of a bimetallic support 46. The rotary disk 44 can be secured with a set-screw 45.

The wire 35 is fixed to the upright arm 36 of an L-shaped lever 32, pivoting on an axle 48. The substantially level arm 33 of the lever 32 carries a pan 34 with a mass 10 to be measured, and a socket 39 for a rotary disk 40. A reference mass 43 is mounted to the socket 39 by way of a bimetallic support 42. Again the rotary disk 40 can be secured with a set-screw 41.

At reference temperature the bimetallic supports are flat and substantially perpendicular to the level arms 30, 33 of the levers 29, 32. At elevated temperature with respect to reference temperature, the support 46 bends towards the axle 28, thereby offsetting the increase in length of the arm 30. The compensating mass 47 on its bimetallic support thus takes care of maintaining the steepness of the characteristic. Under the same temperature conditions the bimetallic support 42 bends likewise towards the axle 48, thereby offsetting the increase in length of the arm 33 of the lever 32. The compensating mass 43 on its bimetallic support 42 takes care of compensating for the shift of the zero-point. In order to keep this correction independent from the correction of the steepness, the center of gravity of the mass 43 is to be contained in a plane defined by the axle 48 and the extension of the arm 33.

By rotating the disks 40, 44 the amount of correction can be adjusted, since only the components of the shifts of the said compensating masses 43, 47 parallel to the directions of the respective level arms are effective, the components being perpendicular thereto are absorbed by the bearings of the axles 28, 48 respectively.

In FIG. 2 the invention is adapted to a balance with vibrating strings forming a Vee. It is obvious that it can be adapted likewise to a balance with vibrating strings where the strings are substantially parallel and/or the reference mass is not mounted to a lever but is guided in parallel instead. In the latter case the compensating mass can be mounted to an additional two armed lever pivoting with respect to the frame of the balance, the other arm of said lever being connected to the reference mass with a wire which extends parallel to the direction of the movement of the reference mass.

Figures 3, 4:
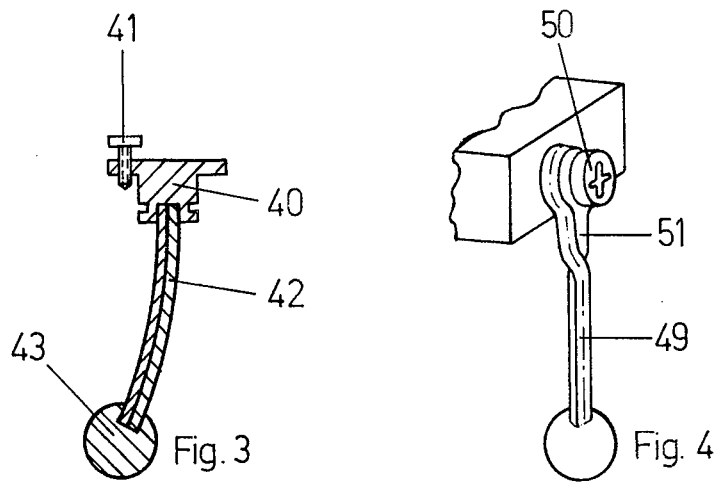
FIG. 3 is an enlarged sectional view of a compensating mass shown in FIG. 2.
FIG. 4 is an elevational view of a compensating mass carried by a ductile bimetallic support.

FIG. 3 is an enlarged sectional view of the rotary disk 40, the set-screw 41, the compensating mass 43, and its bimetallic support 42. The support 42 is shown in bent position corresponding to a temperature deviation with respect to reference temperature.

FIG. 4 is another embodiment of a bimetallic support 49. It is fastened to a convenient member by means of a bolt 50. The bimetallic support 49 is made from ductile metals which can be forced. In order to adjust the amount of correction, the support 49 will be twisted with a suitable tool, along a zone 51 adjacent to the bolt 50. In this embodiment the zone 51 assumes the function of the rotary disk 40 according to FIG. 3.

In the embodiment shown in FIG. 5, the compensating mass 47 is carried by a frame of four bimetallic strips 52, 56, 53, 57. The strips 52, 56 are welded together at a location indicated by a numeral 58; the strips 53, 57 are welded together at a location indicated by a numeral 59. The compensating mass 47 is welded to the strips 56, 57 at points 60, 61, and the strips 52, 53 are welded to the rotary disk 44 at points 54, 55. At elevated temperature with respect to reference temperature the strips 52, 53 bend to the right, the strips 56, 57 bend to the left. Thereby the mass 47 is shifted to the right. The desired direction and amount of the shift will be set by means of the rotary disk 44, in FIG. 5 shown as being carried by the lever 29. The position of the rotary disk 44 can be secured with a set-screw 45.

In FIG. 6 three positions of the compensating mass 47 according to FIG. 5 are shown corresponding to three different temperatures: The solid lines represent the position at elevated temperature, the dashed lines represent the position at reference temperature, the lines with dots and dashes represent the position at reduced temperature.

I claim:

1. A balance, comprising:
   a balance pan for receiving an object to the weighed;
   object force transmitting means coupled to said balance pan for transmitting forces produced by the weight of an object on said pan;
   a reference mass;
   reference force transmitting means coupling said reference mass to said balance pan for transmitting forces produced by said reference mass to said pan to compensate for the mass of said pan, thereby to provide a reference zero-point force when no object is located on said pan;
   a first compensating mass;
   a first bimetallic support coupling said first compensating mass to said reference force transmitting means to compensate for a thermally induced shift of said zero-point;
   a second compensating mass; and
   a second bimetallic support coupling said second compensating mass to said object force transmitting means to compensate for a thermally induced change in the slope of the characteristic of said balance.

2. A balance according to claim 1, wherein the said bimetallic supports are ductile and are twisted to stay permanently in the twisted position whereby the amount of compensation is adjusted.

3. A balance according to claim 1, further comprising:
   a first rotatable member mounting said first bimetallic support to said reference force transmitting means for adjusting the direction in which thermally induced movement of said first compensating mass due to said first bimetallic support occurs; and
   a second rotatable member mounting said second bimetallic support to said object force transmitting means for adjusting the direction in which thermally induced movement of said second compensating mass due to said second bimetallic support occurs.

4. A balance according to claim 3, wherein each of said bimetallic supports comprises two pairs of bimetallic strips mounting the respective compensating mass, its corresponding rotatable member, for moving said compensating mass in one direction at temperatures above a reference temperature and in an opposite direction at temperatures below said reference temperature.

5. A balance, comprising:
   a frame;
   a balance pan for receiving an object to be weighed;
   a first member coupled to said balance pan and movable therewith, said first member being pivotably mounted to said frame;
   a second member coupled to said first member for movement therewith, said second member mounting a reference mass to compensate for the weight of said balance pan and provide a zero-point when said pan is unloaded;
   first and second compensating masses; and
   first and second bimetallic support members mounting said first and second compensating masses to said second member to compensate for thermally induced shifts in the zero-point and slope of the characteristic of said balance.

6. A balance according to claim 5, wherein the longitudinal axes of said first and second bimetallic support members are located substantially at right angles to each other to produce thermally induced movement of said compensating masses in directions substantially at right angles to each other.

7. A balance, comprising:
a frame;
first and second vibrating strings mounted between said frame and a central member;
a balance pan for receiving an object mass to be weighed;
object force transmitting means, comprising a first force transmitting member mounted to said frame for pivotal movement in a first plane, said first force transmitting member having one end portion coupled to said balance pan and a second end portion coupled through a wire to said central member for transmitting forces produced by an object mass to said vibrating strings;
a first rotatable member mounted to said first force transmitting means;
a first compensating mass;
a first bimetallic support coupling said first compensating mass to said first rotatable member, wherein the plane of thermally induced movement of said first compensating mass due to said first bimetallic support is adjustable by said first rotatable member relative to the plane of movement of said first force transmitting member;
a reference mass;
reference force transmitting means, comprising a second reference force transmitting member mounted to said frame for pivotal movement in a second plane different from the plane of pivotal movement of said first force transmitting member, said second force transmitting member having one end portion coupled to said reference mass and a second end portion coupled through a wire to said central member for transmitting a zero-point compensating force to said vibrating strings when no object mass is located on said balance pan;
a second rotatable member mounted to said reference force transmitting means;
a second compensating means;
a second bimetallic support coupling said second compensating mass to said second rotatable member, wherein the plane of thermally induced movement of said second compensating mass due to said second bimetallic support is adjustable by said second rotatable member relative to the plane of movement of said second force transmitting member.

8. A balance according to claim 7, wherein each of said bimetallic supports comprises two pairs of bimetallic strips mounting the respective compensating mass, its corresponding rotatable member for moving said compensating mass in one direction at temperatures above a reference temperature and in an opposite direction at temperatures below said reference temperature.

* * * * *